(12) United States Patent
Frait et al.

(10) Patent No.: US 11,644,116 B1
(45) Date of Patent: May 9, 2023

(54) UNITIZED VALVE BODY HAVING FLOW PASSAGES

(71) Applicant: Ford Global Technologies, LLC, Dearborn, MI (US)

(72) Inventors: Steven Anatole Frait, Milan, MI (US); Frank Hanson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/552,032

(22) Filed: Dec. 15, 2021

(51) Int. Cl.
*F16K 27/00* (2006.01)
*F16K 11/22* (2006.01)
*B33Y 80/00* (2015.01)

(52) U.S. Cl.
CPC .............. *F16K 27/00* (2013.01); *F16K 11/22* (2013.01); *B33Y 80/00* (2014.12)

(58) Field of Classification Search
CPC ...... F16K 27/00; F16K 27/02; F16K 27/0263; F16K 27/029; F16K 27/048; F16K 27/04; F16K 11/22; B33Y 10/00; B33Y 80/00
See application file for complete search history.

(56) References Cited

U.S. PATENT DOCUMENTS

| | | | | |
|---|---|---|---|---|
| 8,316,757 | B2 * | 11/2012 | Rinaldi | F15B 13/0814 91/445 |
| 10,744,991 | B2 * | 8/2020 | Mayr | B60T 17/04 |
| 10,746,201 | B2 * | 8/2020 | Weickel | B33Y 80/00 |
| 11,465,213 | B2 * | 10/2022 | He | B22F 10/25 |
| 2018/0172146 | A1 * | 6/2018 | Uesugi | B22F 5/10 |
| 2018/0180070 | A1 * | 6/2018 | Uesugi | F16K 27/003 |
| 2020/0096020 | A1 * | 3/2020 | Funsch | F15B 13/0814 |
| 2020/0124196 | A1 * | 4/2020 | Guender | F16K 27/003 |
| 2022/0196145 | A1 * | 6/2022 | Henley, III | F16H 61/0276 |

FOREIGN PATENT DOCUMENTS

| | | | | |
|---|---|---|---|---|
| CN | 109323019 | A * | 2/2019 | ........... B22F 3/1055 |
| CN | 109323019 | | 4/2020 | |
| DE | 102017126296 | A1 * | 5/2019 | |
| DE | 102019132784 | B4 * | 10/2022 | ............. B33Y 80/00 |
| DE | 102021203719 | A1 * | 10/2022 | |
| JP | 6350409 | | 7/2018 | |
| WO | 2021105158 | | 6/2021 | |
| WO | WO-2021105158 | A1 * | 6/2021 | .......... A61M 1/1621 |
| WO | WO-2021111745 | A1 * | 6/2021 | |

\* cited by examiner

*Primary Examiner* — David Colon-Morales
(74) *Attorney, Agent, or Firm* — Burris Law, PLLC

(57) ABSTRACT

A unitized valve body for use in an automatic transmission includes a plurality of valve bores and a plurality of hydraulic passages. Each valve bore is configured to receive a valve. The plurality of hydraulic passages are in fluid communication with the valve bores and arranged parallel to each other. The plurality of valve bores extend normal to the hydraulic passages and are arranged above and below the hydraulic passages.

20 Claims, 8 Drawing Sheets

UNITIZED VALVE BODY HAVING FLOW PASSAGES

FIELD

The present disclosure relates to a valve body having flow passages and a vehicle including a valve body having flow passage.

BACKGROUND

The statements in this section merely provide background information related to the present disclosure and may not constitute prior art.

Transmission valve bodies typically consist of aluminum castings with worm trail routing of multiple connections between various working elements. These worm trail fluid paths typically must be two-dimensional, and cannot cross over a path of another trail. Due to this two-dimensional limitation of typical transmission valve bodies, providing a flow path from one element to another can often require a lengthy and convoluted path that adds to the complexity, cost, and size of the casting.

One method of overcoming this two-dimensional limitation includes manufacturing multiple valve bodies, each having its own two-dimensional worm trails, and connecting the valve bodies with one or more separator plates configured to permit fluid communication between the worm trails of the valve bodies in a third dimension at predetermined locations. Such separator plates require gasket seals and precise machining of the gasket surfaces. These separator plates also only allow binary cross-over of the hydraulic circuitry from one two-dimensional worm trail casting to another two-dimensional worm trail casting. Furthermore, the use of separator plates typically requires the use of additional fasteners to connect the assembly together, which can increase cost and assembly time. Additionally, the two-dimensional worm trails of each valve body must be routed around these fasteners, adding further size and complexity.

These sizing and complexity issues related to transmission valve bodies, among other issues related transmission valve bodies, are addressed by the present disclosure.

SUMMARY

This section provides a general summary of the disclosure and is not a comprehensive disclosure of its full scope or all of its features.

In one form, the present disclosure provides a unitized valve body for use in an automatic transmission. The unitized valve body comprises a plurality of valve bores and a plurality of hydraulic passages. Each valve bore is configured to receive a valve. The plurality of hydraulic passages are in fluid communication with the valve bores and arranged parallel to each other. The plurality of valve bores extend normal to the hydraulic passages and are arranged above and below the hydraulic passages.

In variations of the unitized valve body of the above paragraph, which may be implemented individually or in any combination: the valve bores are arranged above and below the hydraulic passages in a staggered arrangement; a plurality of annuluses in fluid communication with a respective valve bore, the hydraulic passages being in fluid communication with the valve bores via the annuluses; a first set of hydraulic passages of the plurality of hydraulic passages are arranged in a row; a second set of hydraulic passages of the plurality of hydraulic passages are arranged in a row and a linking passage fluidly connects one hydraulic passage of the first set of hydraulic passages with one hydraulic passage of the second set of hydraulic passages; the linking passage extends normal to the hydraulic passages and the valve bores; the hydraulic passages are substantially linear; the valve body does not include mechanical fasteners; the valve body is formed by additive manufacturing; and the hydraulic passages have a circular cross-section.

In another form, the present disclosure provides a unitized valve body for use in an automatic transmission. The unitized valve body comprises a plurality of valve bores and a plurality of hydraulic passages. The plurality of hydraulic passages are in fluid communication with the valve bores and are arranged parallel to each other. The hydraulic passages being substantially linear. The plurality of valve bores extend normal to the hydraulic passages and are arranged above and below the hydraulic passages.

In yet another form, the present disclosure provides a unitized valve body manufactured by an additive manufacturing process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
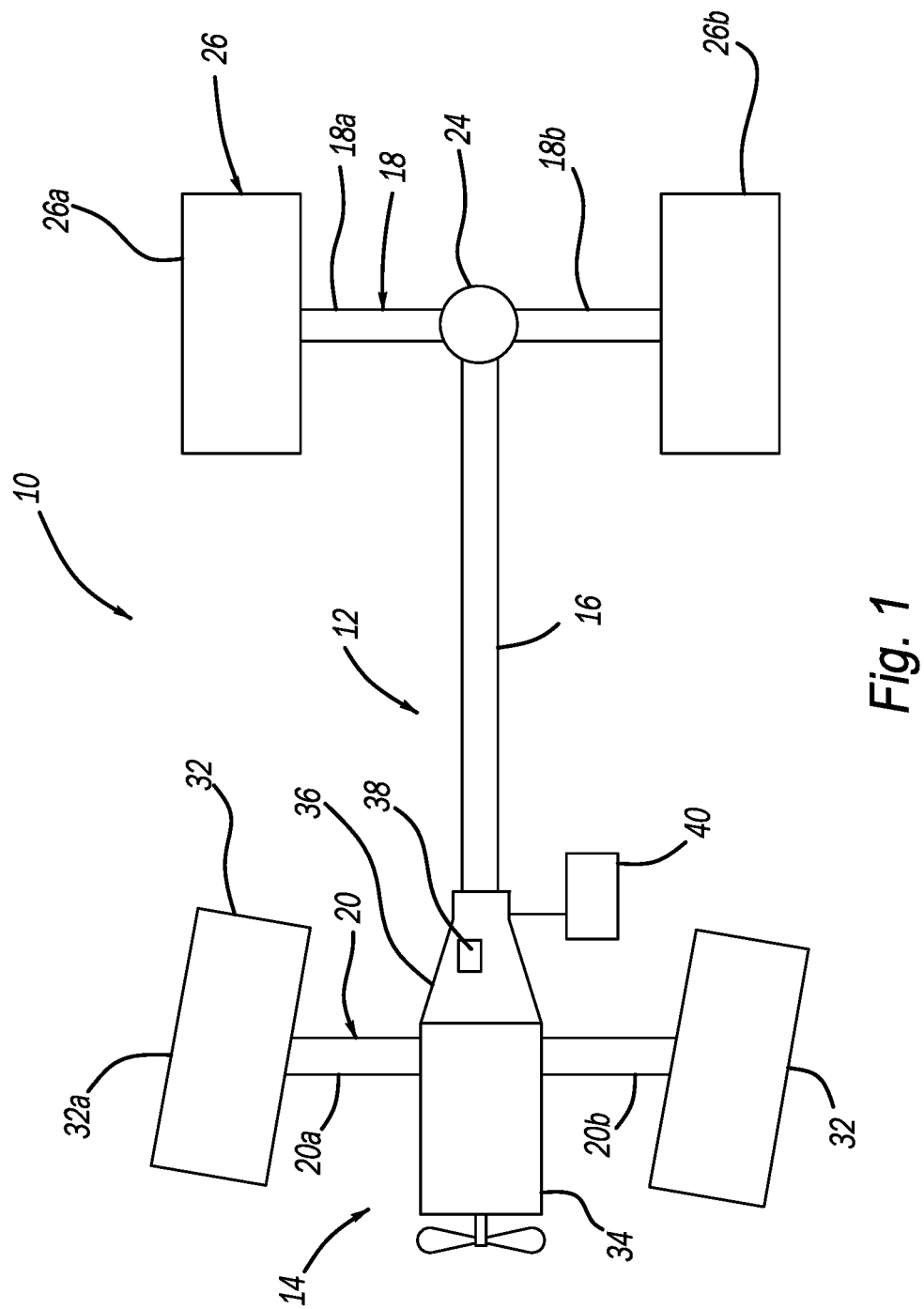
FIG. 1 is a schematic view of a vehicle including a transmission having a valve body assembly according to the principles of the present disclosure.
Figure 2:
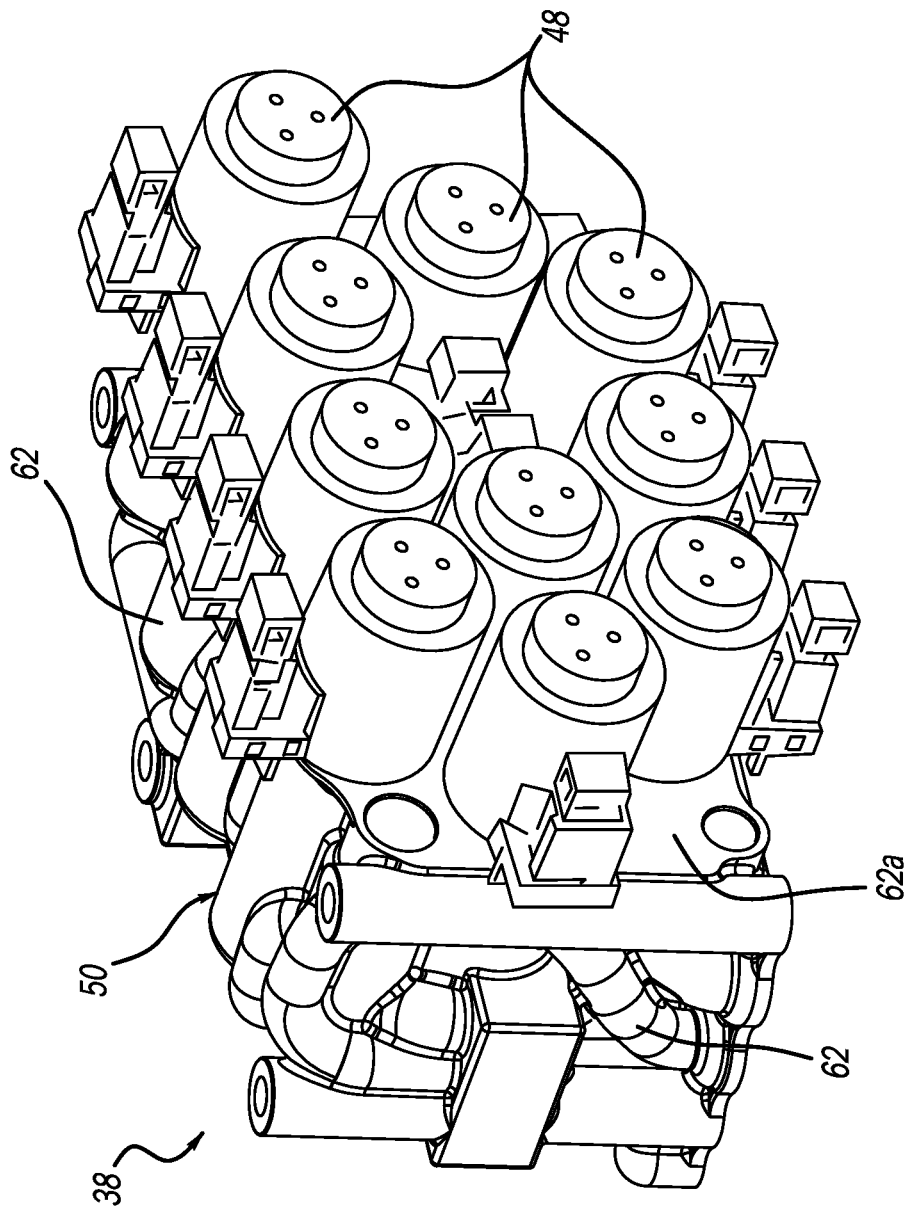
FIG. 2 is a perspective view of the valve body assembly of FIG. 1.
Figure 3:
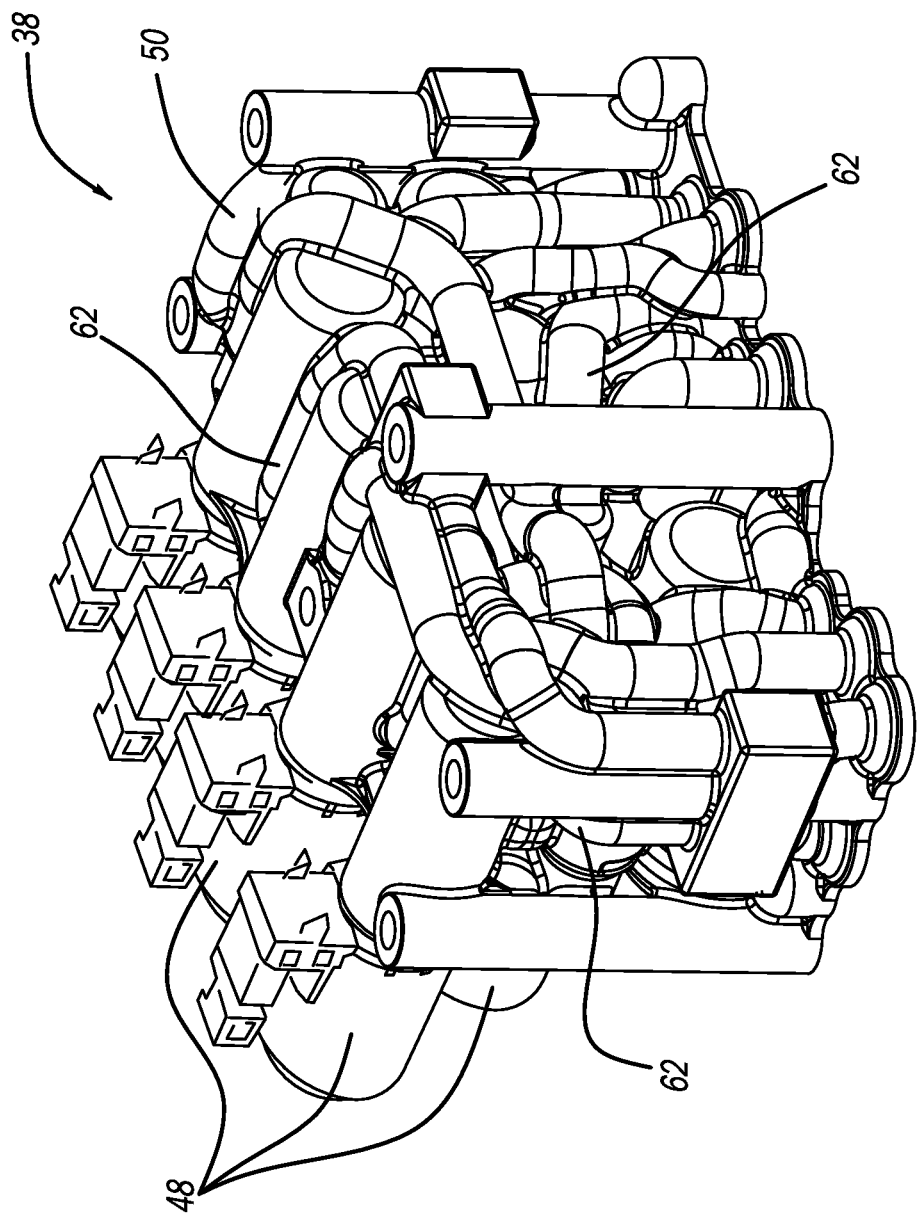
FIG. 3 is another perspective view of the valve body assembly of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotary power generated by the powertrain system 14 is transmitted to the primary axle 18 via the propeller shaft 16 to drive a set of rear wheels 26. The primary axle 18 includes a first shaft 18a and a second shaft 18b. The first shaft 18a drives a first wheel 26a of the set of rear wheels 26 and the second shaft 18b drives a second wheel 26b of the set of rear wheels 26. The secondary axle 20 includes a first shaft 20a and a second shaft 20b. The first shaft 20a is connected to a first wheel 32a of a set of front wheels 32 and the second shaft 20b is connected to a second wheel 32b of the set of front wheels 32. The powertrain system 14 includes an engine 34 and a transmission 36 such as an automatic transmission, for example. The engine 34 generates rotary power and may be an internal combustion engine, for example.

The transmission 36 transmits rotary power from the engine 34 to the drivetrain system 12. The transmission 36 is generally controlled using hydraulic fluid. That is, the transmission 36 is cooled, lubricated, actuated, and modulates torque, for example, using hydraulic fluid. To these ends, the transmission 36 is in electrical communication with an electronic controller 40 used to direct, control, or otherwise regulate flow of fluid throughout the transmission 36. In order to facilitate the flow of hydraulic fluid throughout the transmission 36, the vehicle 10 includes at least one or more pumps to supply pressurized fluid to the transmission 36. It should be appreciated that the pumps provide high flow high pressure hydraulic fluid to the transmission 36.

The transmission 36 includes, inter alia, a casing (not shown) and a valve body assembly 38. With reference to FIGS. 2-7, the valve body assembly 38 is secured to the casing and includes a plurality of solenoid actuators 48 and a valve body 50. Each solenoid actuator 48 includes a spool valve (not shown; i.e., hydraulic control valve). The spool valve is slidably disposed within a corresponding valve bore 53 of the valve body 50 and is configured to be axially positioned by an armature (not shown) of the solenoid actuator 48 depending on an activation state of the solenoid actuator 48. The spool valve includes a plurality of cylindrical sealing segments (not shown) axially spaced apart from each other and having an outer diameter greater than adjacent lengths of the spool valve. A cylindrical surface (not shown) of the sealing segments is allowed to engage an inner cylindrical surface of the valve bore 53, while fluid communication is permitted in the areas between adjacent ones of the sealing segments. A spring (not shown) may bias the spool valve in an axial direction within the valve bore 53. The solenoid actuators 48 can be on/off actuators, variable pressure actuators, or variable flow actuators and can receive electrical power from an electrical source and can receive control signals from a control module.

The valve body 50 is in the form of a single unitized, monolithic body that can be manufactured by an additive manufacturing process. In this way, the valve body 50 does not include fasteners such as bolts, for example, securing two or more shells or housings to each other and/or to one or more separator plates. In one example, the manufacturing process can include aluminum binder jetting. In another example, the manufacturing process can include laser sintering, for example, that can generally include a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure.

The valve body 50 includes a plurality of sides 62. In the example illustrated, side 62a (FIGS. 2, 4, and 7) of the valve body 50 defines the plurality of valve bores 53 formed therein. The valve body 50 also defines a plurality of annuluses or rings 63 (FIGS. 5 and 7) and a plurality of trunk hydraulic passages 64 (FIGS. 4-7). The plurality of annuluses 63 are axially spaced apart from each other along a corresponding valve bore 53. The annuluses 63 are also in fluid communication with the corresponding valve bore 53. Each annulus 63 is also in fluid communication with a corresponding passage 64 via an inlet/outlet port. One example of such annulus 63 is disclosed in Applicant's co-pending application titled "UNITIZED VALVE BODY HAVING ANNULUS" which is commonly owned with the present application and the contents of which are incorporated herein by reference in its entirety.

A plurality of connecting passages 66 are in fluid communication with different devices through the transmission 36. For example, the connecting passages 66 can be coupled to a corresponding one of a return line of a pump (not shown), an outlet of a cooling fluid circuit (not shown), a supply line of the pump (not shown), a clutch lubrication circuit (not shown), a clutch actuator (not shown) corresponding to the odd numbered gears (not shown) of the transmission 36, a filtered fluid inlet (not shown), or a clutch actuator (not shown) corresponding to the even numbered gears (not shown) of the transmission 36, though other devices can be used.

Figure 8:
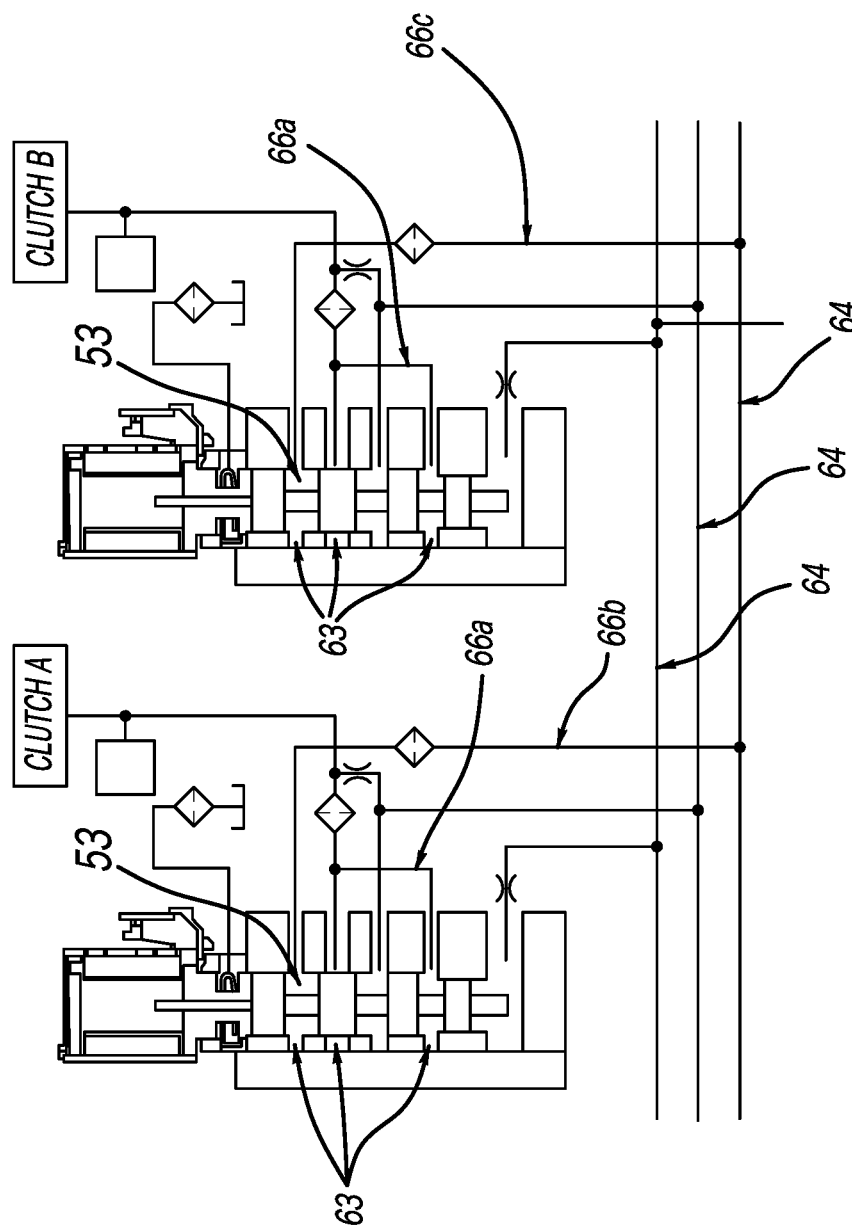
FIG. 8 is a schematic view of a portion of a hydraulic circuit of the transmission of FIG. 1.

The plurality of connecting passages 66 are also in fluid communication with respective valve bores 53 and/or one or more hydraulic passages 64. As shown in FIG. 8, in one example, passage 66a fluidly connects one annulus 63 associated with a respective valve bore 53 to another annulus 63 associated with the respective valve bore 53. In another example, connecting passages 66b, 66c fluidly connect a respective annulus 63 associated with one valve bore 53 to a respective annulus 63 associated with another valve bore 53. The first and second connecting passages 66b, 66c may be fluidly connected via a respective hydraulic passage 64.

Figure 4:
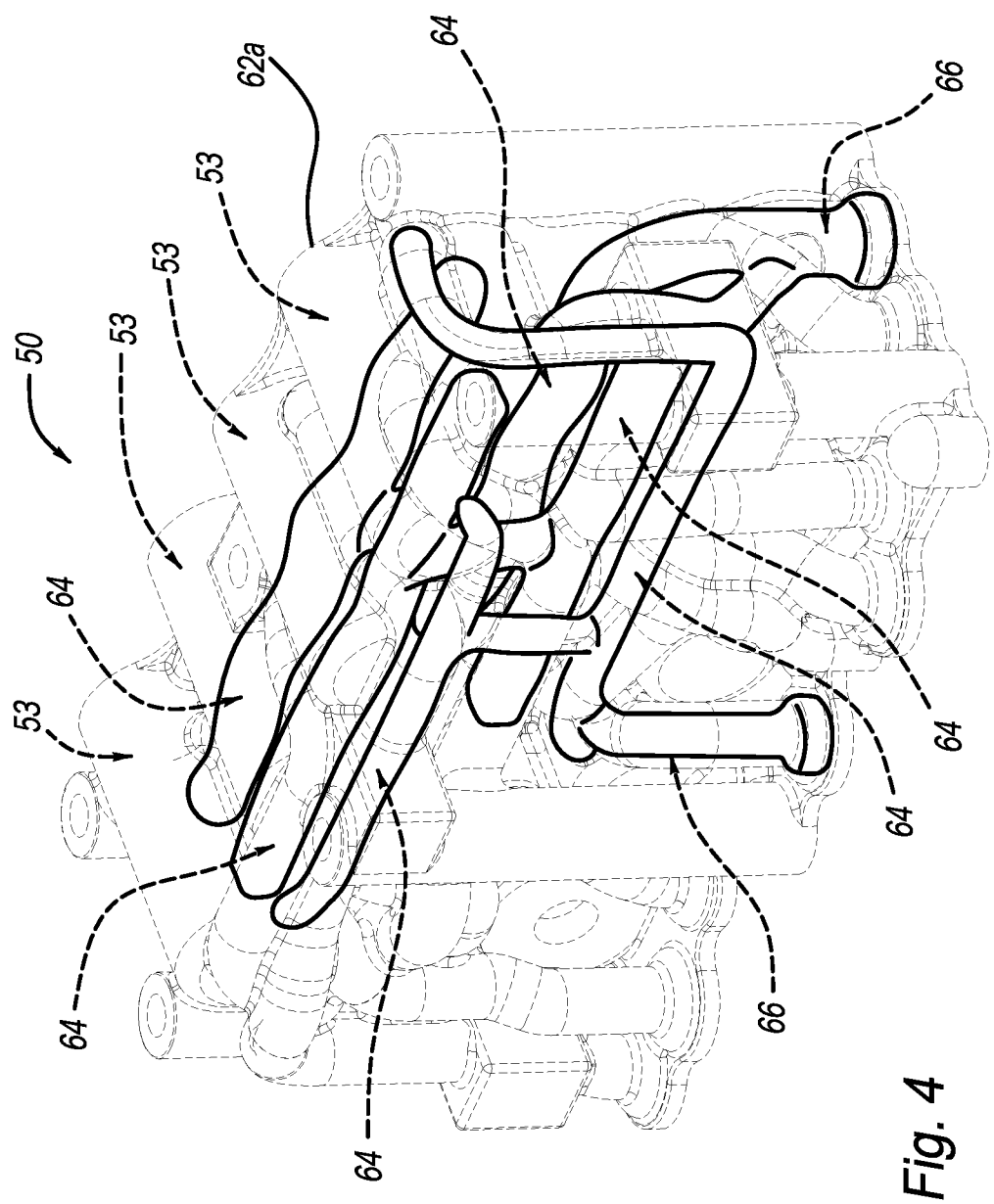
FIG. 4 is a perspective view of a valve body of the valve body assembly of FIG. 1.
Figure 5:
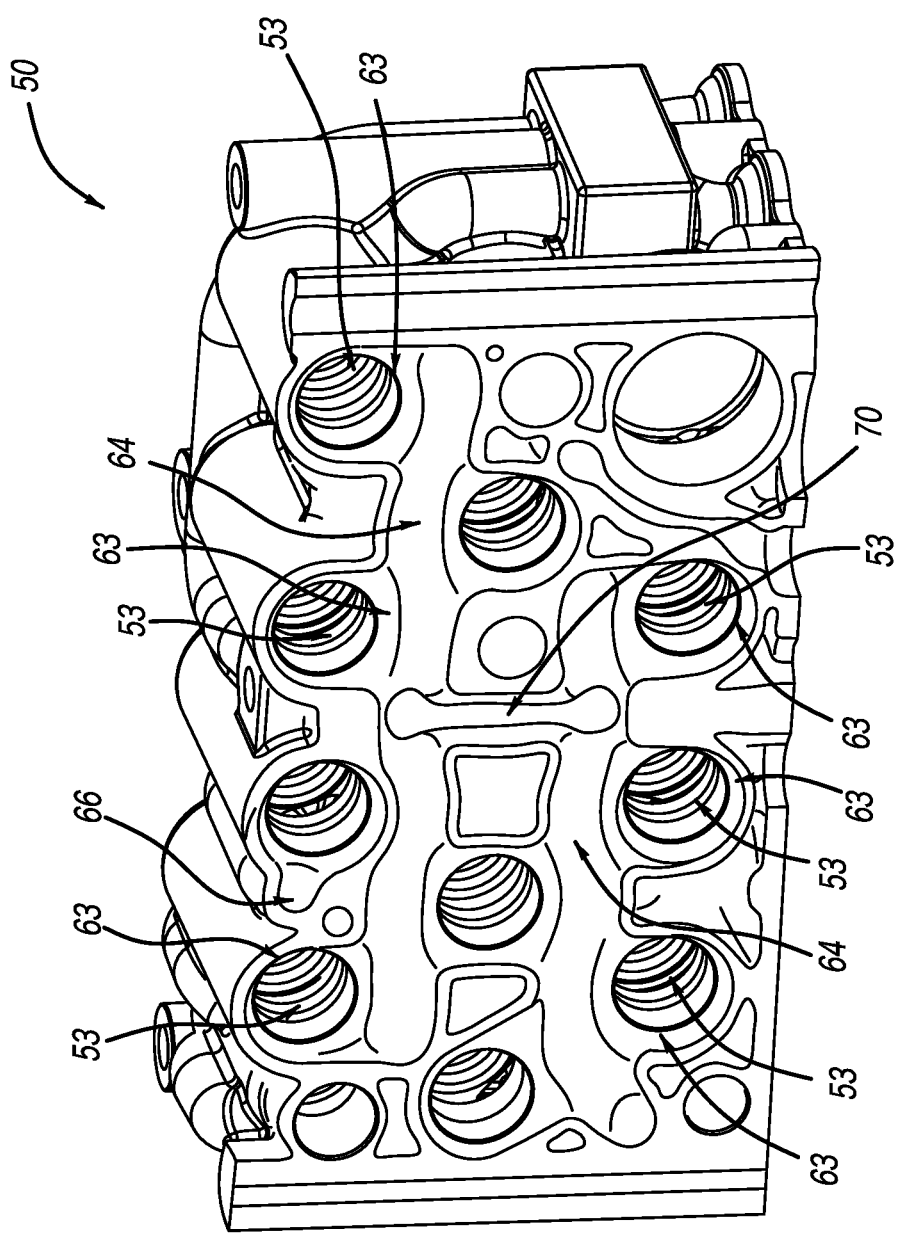
FIG. 5 is a cross-sectional perspective view of the valve body of the valve body assembly of FIG. 1.
Figure 6:
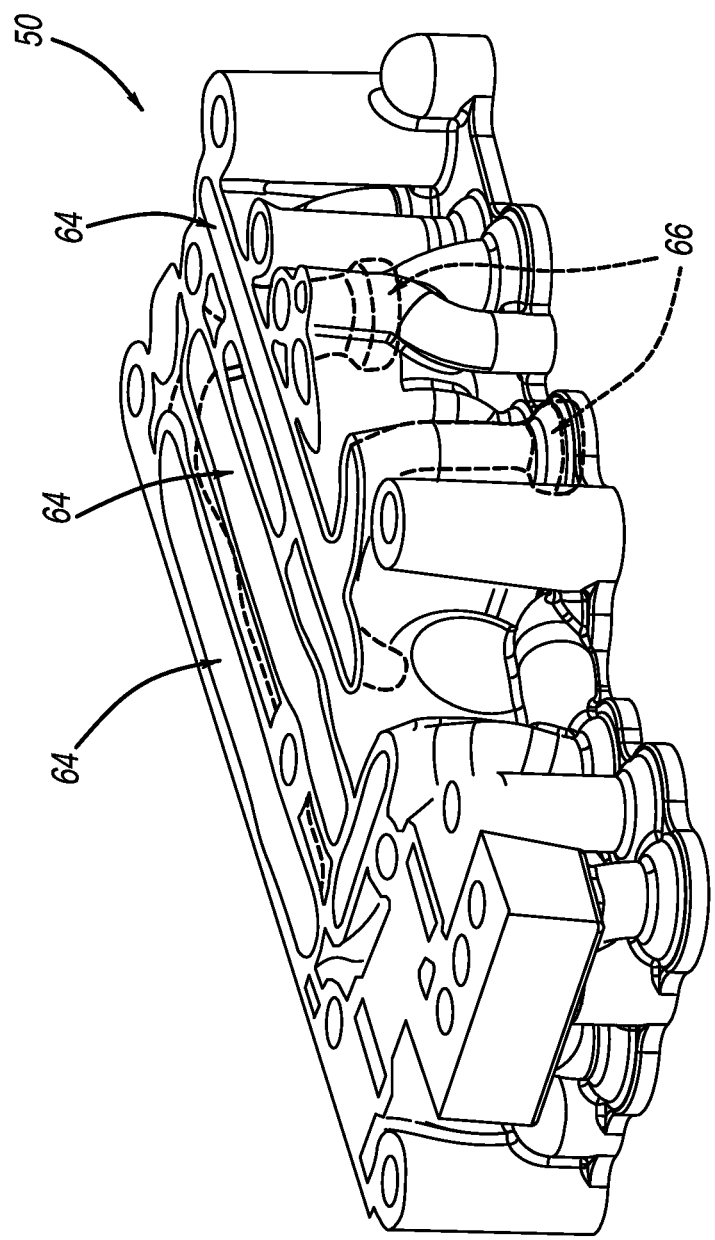
FIG. 6 is another cross-sectional perspective view of the valve body of the valve body assembly of FIG. 1.
Figure 7:
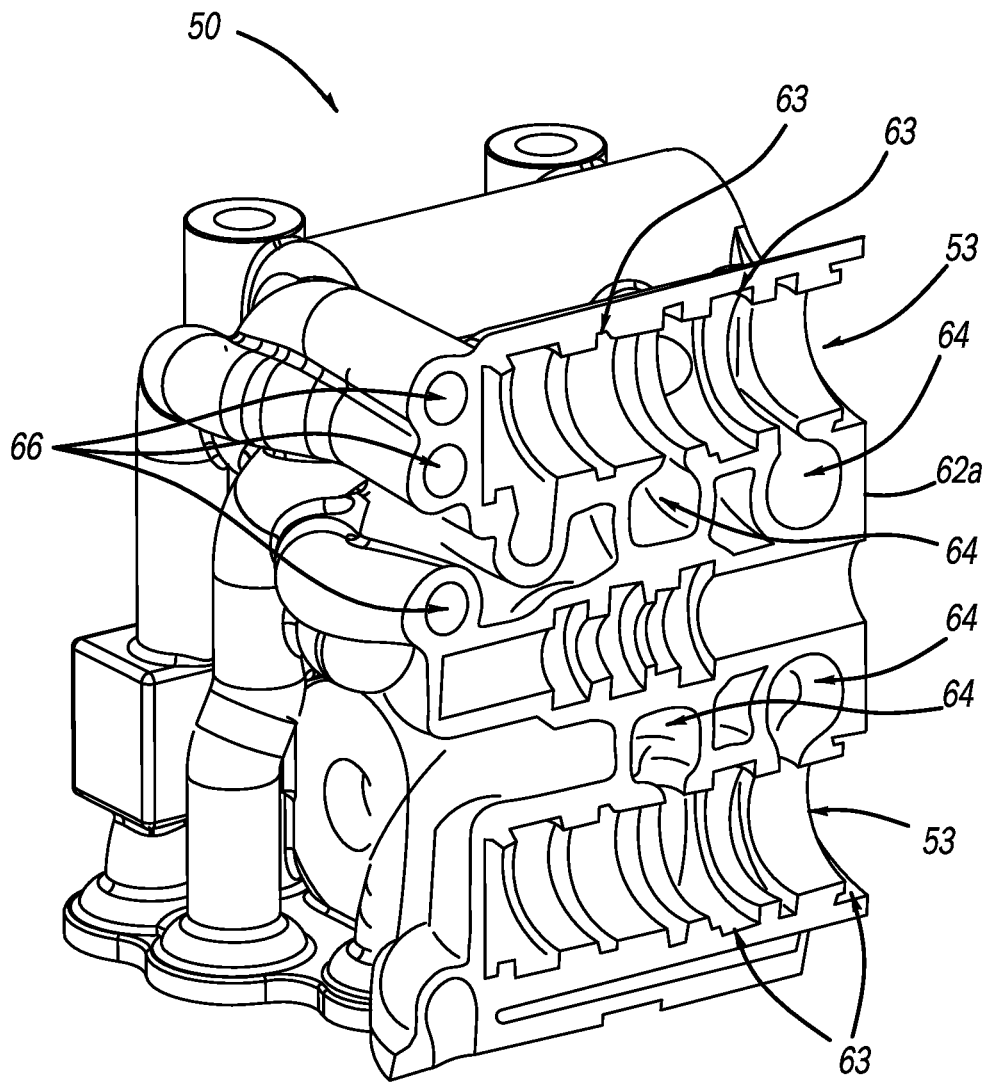
FIG. 7 is yet another cross-sectional perspective view of the valve body of the valve body assembly of FIG. 1.

With reference to FIGS. 4-8, the hydraulic passages 64 may be connected to a pressurized fluid source such as a pump located external to the valve body 50. The hydraulic passages 64 are also in fluid communication with the valve bores 53 and are arranged parallel to each other. The valve bores 53 extend normal to the hydraulic passages 64 and are arranged above and below the hydraulic passages 64 in a staggered arrangement (FIG. 5). In the example illustrated, each hydraulic passage 64 is substantially linear and has a generally circular cross-section. In some forms, the hydraulic passages 64 may have a semi-circular or other suitable cross-section, for example, allowing hydraulic fluid to easily flow through. One or more of the hydraulic passages 64 extend substantially a length of the valve body 50. A set of hydraulic passages 64 are arranged in a row and are fluidly isolated from each other (FIGS. 4 and 6). One hydraulic passage 64 of the set of hydraulic passages 64 arranged in one row is in fluid communication with a corresponding hydraulic passage 64 of another set of hydraulic passages 64 arranged in another row via a linking passage 70. The linking passage 70 extends normal to the hydraulic passages 64 and the valve bores 53. The annuluses 63 are 2.1 times greater than the diameter of the hydraulic passages 64. The valve bores 53 are 2 times greater than the diameter of the hydraulic passages 64. The linking passages 70 are 1.5 times greater than the diameter of the hydraulic passages 64.

The valve body 50 of the present disclosure being additively manufactured provides the benefit of allowing multiple hydraulic passages 64 of the plurality of hydraulic passages 64 to be connected to the valve bores 53. In this way, the hydraulic passages 64 are positioned parallel to each other and the valve bores 53 may be arranged above and below the hydraulic passages 64 in a staggered arrangement, which reduces the overall footprint of the valve body 50. The valve body 50 of the present disclosure being additively manufactured also provides the benefit of reduced passage lengths allowed by connecting passages in multiple dimensions.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A unitized valve body for use in an automatic transmission, the unitized valve body comprising:
   a plurality of valve bores, each valve bore configured to receive a valve; and
   a plurality of hydraulic passages in fluid communication with the valve bores and arranged parallel to each other, wherein the plurality of valve bores extend normal to the hydraulic passages and are arranged above and below the hydraulic passages.

2. The unitized valve body of claim 1, wherein the valve bores are arranged above and below the hydraulic passages in a staggered arrangement.

3. The unitized valve body of claim 1 further comprising a plurality of annuluses in fluid communication with a respective valve bore, the hydraulic passages being in fluid communication with the valve bores via the annuluses.

4. The unitized valve body of claim 1, wherein a first set of hydraulic passages of the plurality of hydraulic passages are arranged in a row.

5. The unitized valve body of claim 4, wherein:
   a second set of hydraulic passages of the plurality of hydraulic passages are arranged in a row; and
   a linking passage fluidly connects one hydraulic passage of the first set of hydraulic passages with one hydraulic passage of the second set of hydraulic passages.

6. The unitized valve body of claim 5, wherein the linking passage extends normal to the hydraulic passages and the valve bores.

7. The unitized valve body of claim 1, wherein the hydraulic passages are substantially linear.

8. The unitized valve body of claim 1, wherein the valve body does not include mechanical fasteners.

9. The unitized valve body of claim 1, wherein the valve body is formed by additive manufacturing.

10. The unitized valve body of claim 1, wherein the hydraulic passages have a circular cross-section.

11. A unitized valve body for use in an automatic transmission, the unitized valve body comprising:
    a plurality of valve bores, each valve bore configured to receive a valve; and
    a plurality of hydraulic passages in fluid communication with the valve bores and arranged parallel to each other, the hydraulic passages being substantially linear,
    wherein the plurality of valve bores extend normal to the hydraulic passages and are arranged above and below the hydraulic passages.

12. The unitized valve body of claim 11, wherein the valve bores are arranged above and below the hydraulic passages in a staggered arrangement.

13. The unitized valve body of claim 11 further comprising a plurality of annuluses in fluid communication with a respective valve bore, the hydraulic passages being in fluid communication with the valve bores via the annuluses.

14. The unitized valve body of claim 11, wherein a set of hydraulic passages of the plurality of hydraulic passages are arranged in a row.

15. The unitized valve body of claim 11, wherein the valve body is formed by additive manufacturing.

16. The unitized valve body of claim 11, wherein the valve body does not include mechanical fasteners.

17. A unitized valve body manufactured by an additive manufacturing process, the unitized valve body comprising:
    a plurality of valve bores; and a plurality of hydraulic passages in fluid communication with the valve bores, the hydraulic passages arranged parallel to each other, the plurality of valve bores extend normal to the hydraulic passages and are arranged above and below the hydraulic passages.

18. The unitized valve body of claim 17, wherein the valve bores are arranged above and below the hydraulic passages in a staggered arrangement.

19. The unitized valve body of claim 17, wherein the hydraulic passages are substantially linear.

20. The unitized valve body of claim 17, wherein a set of hydraulic passages of the plurality of hydraulic passages are arranged in a row.

* * * * *